United States Patent
Yosui et al.

(10) Patent No.: US 9,160,059 B2
(45) Date of Patent: Oct. 13, 2015

(54) ANTENNA DEVICE AND MOBILE TERMINAL

(75) Inventors: Kuniaki Yosui, Kyoto-fu (JP);
Hiromitsu Ito, Kyoto-fu (JP); Hiroyuki Kubo, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 13/339,998

(22) Filed: Dec. 29, 2011

(65) Prior Publication Data

US 2012/0098711 A1    Apr. 26, 2012

Related U.S. Application Data

(63) Continuation of application No. PCT/JP2010/063746, filed on Aug. 13, 2010.

(30) Foreign Application Priority Data

Sep. 25, 2009  (JP) ................................. 2009-221626

(51) Int. Cl.
*H01Q 1/24*  (2006.01)
*G06K 7/10*  (2006.01)
(Continued)

(52) U.S. Cl.
CPC ............ *H01Q 1/243* (2013.01); *G06K 7/10336* (2013.01); *H01Q 1/2216* (2013.01); *H01Q 1/48* (2013.01); *H01Q 7/06* (2013.01)

(58) Field of Classification Search
CPC ....... H01Q 1/38; H01Q 1/243; H01Q 1/2216; H01Q 7/08; G06K 7/10336
USPC ......... 343/787, 788, 895, 702, 741, 742, 866, 343/867
See application file for complete search history.

(56) References Cited

U.S. PATENT DOCUMENTS 6,980,158 B2 * 12/2005 Iguchi et al. .................. 343/702
7,050,007 B2    5/2006 Akiho et al.
(Continued)

FOREIGN PATENT DOCUMENTS

CN     1262431 C     7/2006
CN   100383816 C     4/2008
(Continued)

OTHER PUBLICATIONS

International Search Report; PCT/JP2010/063746; Nov. 16, 2010.
(Continued)

*Primary Examiner* — Dameon E Levi
*Assistant Examiner* — Hasan Islam
(74) *Attorney, Agent, or Firm* — Studebaker & Brackett PC

(57) ABSTRACT

The disclosure provides an antenna device and mobile terminal including such an antenna device. The antenna device includes a coil including a conductor wound around a plate-shaped magnetic core. A flat conductor is positioned adjacent to the coil, and the coil is positioned such that it is closer than the flat conductor to an antenna of a communication partner positioned near the antenna device. The coil conductor includes a first conductor portion adjacent to a first main surface of the magnetic core and a second conductor portion adjacent to a second main surface thereof. The magnetic core and the coil conductor form an antenna coil. A circuit substrate includes a ground electrode formation area and a ground electrode non-formation area. The antenna coil is mounted on the ground electrode non-formation area of the circuit substrate with the first main surface of the magnetic core facing the circuit substrate.

16 Claims, 6 Drawing Sheets

(51) Int. Cl.
  *H01Q 1/48* (2006.01)
  *H01Q 7/06* (2006.01)
  *H01Q 1/22* (2006.01)

(56) References Cited

U.S. PATENT DOCUMENTS

| | | | |
|---|---|---|---|
| 7,061,434 B2 * | 6/2006 | Aoyama et al. | 343/702 |
| 7,148,851 B2 * | 12/2006 | Takaki et al. | 343/702 |
| 7,495,625 B2 * | 2/2009 | Endo et al. | 343/788 |
| 7,642,970 B2 * | 1/2010 | Aoyama et al. | 343/702 |
| 7,825,860 B2 * | 11/2010 | Ying | 343/700 MS |
| 7,952,534 B2 * | 5/2011 | Iwata et al. | 343/893 |
| 8,154,464 B2 * | 4/2012 | Gonda et al. | 343/787 |
| 2003/0179151 A1 | 9/2003 | Senba et al. | |
| 2004/0256468 A1 | 12/2004 | Akiho et al. | |
| 2005/0001031 A1 | 1/2005 | Akiho et al. | |
| 2005/0040997 A1 | 2/2005 | Akiho et al. | |
| 2006/0028384 A1 | 2/2006 | Akiho et al. | |
| 2007/0063902 A1 * | 3/2007 | Leisten | 343/702 |
| 2009/0066466 A1 * | 3/2009 | Arimura | 336/221 |
| 2009/0167624 A1 | 7/2009 | Aramaki et al. | |
| 2009/0189729 A1 | 7/2009 | Kubo et al. | |
| 2010/0214187 A1 | 8/2010 | Sugita et al. | |

FOREIGN PATENT DOCUMENTS

| | | |
|---|---|---|
| EP | 1 445 730 A1 | 8/2004 |
| JP | 2000-048152 A | 2/2000 |
| JP | 2001-028510 A | 1/2001 |
| JP | 2002-325013 A | 11/2002 |
| JP | 2002-373319 A | 12/2002 |
| JP | 2004-118440 A | 4/2004 |
| JP | 2004-164547 A | 6/2004 |
| JP | 2004-166176 A | 6/2004 |
| JP | 2004-08-19 A | 8/2004 |
| JP | 2006-129003 A | 5/2006 |
| JP | 2006-352370 A | 12/2006 |
| JP | 2007-013662 A | 1/2007 |
| JP | 2007-149032 A | 6/2007 |
| JP | 3975918 | 9/2007 |
| JP | 2008-126451 A | 6/2008 |
| WO | 2008/053631 A1 | 5/2008 |
| WO | 2009/078214 A1 | 6/2009 |

OTHER PUBLICATIONS

Written Opinion of the International Searching Authority; PCT/JP2010/063746; Nov. 16, 2010.
M.Satou; Japanese Office Action; JP2011-506265; Jun. 22, 2011.
M.Satou; Japanese Office Action; JP2011-506281; Jun. 22, 2011.
Korean Office Action "Norification of Reason for Refusal" dated Dec. 4, 2012, which corresponds to Korean Patent Application No. 10-2011-7025524 and is related to U.S. Appl. No. 13/339,998.
K.Yosui; U.S. Appl. No. 13/340,022, filed Dec. 29, 2011.
An Office Action issued by the State Intellectual Property Office of People's Republic of China on Jul. 2, 2013, which corresponds to Chinese Patent Application No. 201080019042.X and is related to U.S. Appl. No. 13/339,998; with translation.
"The Second Office Action," issued by the State Intellectual Property Office (SIPO) of People's Republic of China on Jan. 10, 2014, which corresponds to SIPO Application No. 201080019042.X and is related to U.S. Appl. No. 13/339,998.
An Office Action: "Notification of Reason for Rejection," issued by the Japanese Patent Office on Aug. 20, 2013, which corresponds to Japanese Patent Application No. 2011-285265 and is related to U.S. Appl. No. 13/339,998; with English language translation.
The extended European search report issued on Oct. 16, 2013, which corresponds to EP10 818 638.8 and is related to U.S. Appl. No. 13/339,998.
The third Office Action issued by the State Intellectual Property Office of People's Republic of China on Jul. 11, 2014, which corresponds to Chinese Patent Application No. 201080019042.X and is related to U.S. Appl. No. 13/339,998; with English translation.

* cited by examiner

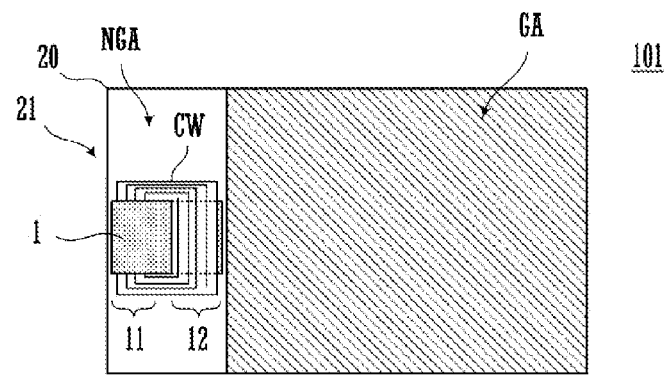
FIG.2A
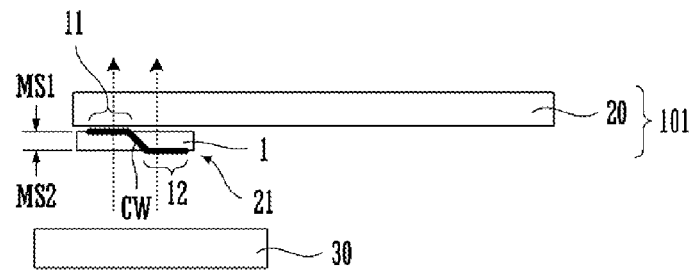
FIG.2B
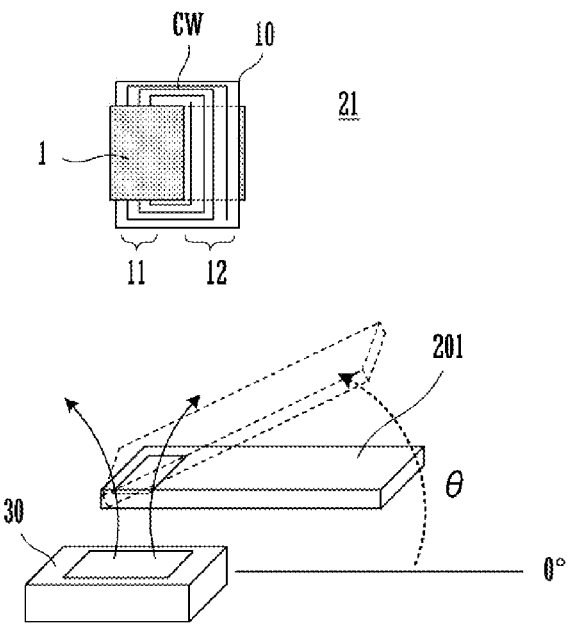
FIG.2C
FIG.3

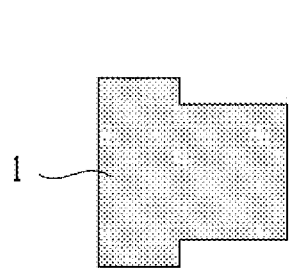
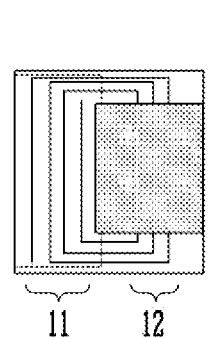
FIG.6A　　　FIG.6B
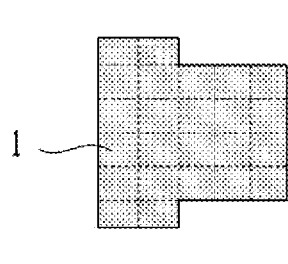
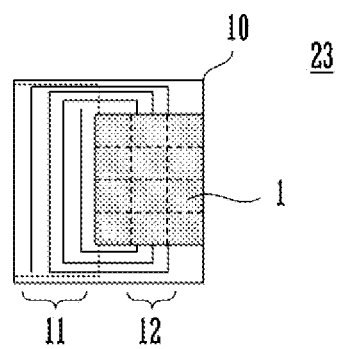
FIG.7A　　　FIG.7B
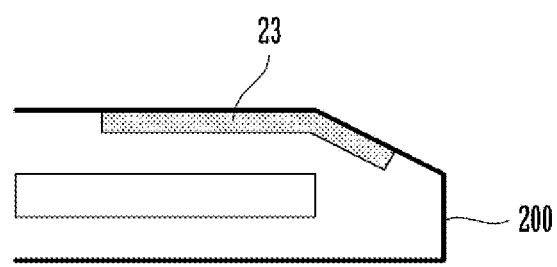
FIG.8

ANTENNA DEVICE AND MOBILE TERMINAL

CROSS REFERENCE TO RELATED APPLICATIONS

The present application is a continuation of International Application No. PCT/JP2010/063746 filed Aug. 13, 2010, which claims priority to Japanese Patent Application No. 2009-221626 filed Sep. 25, 2009, the entire contents of each of these applications being incorporated herein by reference in their entirety.

TECHNICAL FIELD

The present invention relates to an antenna device for use in, e.g., RFID (radio frequency identification) systems, which communicate with external devices using electromagnetic signals, and a mobile terminal including the same.

BACKGROUND

Japanese Patent No. 3975918 (Patent Literature 1) discloses an antenna device included in a mobile electronic apparatus for use in RFID systems. The antenna device of Patent Literature 1 includes an asymmetrical coil where two positions are opposed to each other with the center of a coil winding area therebetween and the winding pitch varies between the two positions. On a side having a larger winding pitch, a magnetic body is disposed on the back of a main surface opposed to an IC card; on a side having a smaller winding pitch, a magnetic body is disposed on the main surface opposed to the IC card.

SUMMARY

The present disclosure provides an antenna device that can reduce degradation of communication performance depending on the angle which the antenna device forms with the reading surface of a reader/writer, and a mobile terminal including the same.

In one aspect, an antenna device includes an antenna coil and a flat conductor adjacent to the antenna coil. The antenna coil includes a plate-shaped magnetic core having first and second main surfaces and a coil conductor wound around the magnetic core. The antenna coil is configured such that when a communication partner is positioned near the antenna device, the antenna coil is closer than the flat conductor to an antenna of the communications partner. First and second conductor portions of the coil conductor are provided in positions that do not overlap each other in a perspective plan view of the magnetic core. The first conductor portion is adjacent to the first main surface of the magnetic core, and the second conductor portion is adjacent to the second main surface thereof. The first main surface of the magnetic core faces a surface of the flat conductor. The antenna coil is provided in a position which does not overlap the flat conductor or a position which overlaps the flat conductor in a plan view of the flat conductor and the antenna coil.

In a more specific embodiment, the flat conductor may be a ground electrode formed within a circuit substrate. The antenna coil may be disposed on a ground electrode non-formation area of the circuit substrate, the ground electrode non-formation area being an area where the ground electrode is not formed.

In another more specific embodiment, the magnetic core may be a sheet-shaped mixture of a magnetic powder and a resin material or a plurality of sintered magnetic pieces.

In yet another more specific embodiment, the magnetic core is formed so that one end portion thereof is larger than the other portions thereof.

In another aspect of the disclosure, a mobile terminal includes a case and any one of the above-mentioned antenna devices contained in the case.

BRIEF DESCRIPTION OF DRAWINGS

FIGS. 2A and 2B are drawings showing the configuration of an antenna device according to a first exemplary embodiment: FIG. 2A is a plan view of an antenna device; FIG. 2B is a front view thereof; and FIG. 2C a plan view of an antenna coil.

FIG. 3 is a perspective view showing an angle θ, at which a mobile terminal whose case contains an antenna device is held over an antenna device of a reader/writer.

FIG. 6A is a plan view of a magnetic core included in an antenna coil according to a second exemplary embodiment, and FIG. 6B is a plan view of an antenna coil according to the second exemplary embodiment.

FIG. 7A is a plan view of a magnetic core included in an antenna coil according to a third exemplary embodiment, and FIG. 7B is a plan view of an antenna coil according to the third exemplary embodiment.

FIG. 8 is a drawing showing the state of the disposition of an antenna coil in a mobile terminal.

FIG. 11A is a plan view of an antenna device; FIG. 11B is a front view thereof; and FIG. 11C a perspective view showing the aspect of magnetic fluxes passing through an antenna coil.

DETAILED DESCRIPTION

The inventors realized that when an electronic apparatus including the antenna device described in Patent Literature 1 is held over a reader/writer, communication may be impossible depending on the angle which the antenna device of the electronic apparatus forms with the antenna device of the reader/writer. That is, when the mobile terminal communicates with an IC card in parallel therewith, no significant problem occurs; when the mobile terminal communicates with a fixed reader/writer or the like, the position (angle) of the mobile terminal relative to the reader/writer varies, disadvantageously degrading communication performance.

Figure 1A:
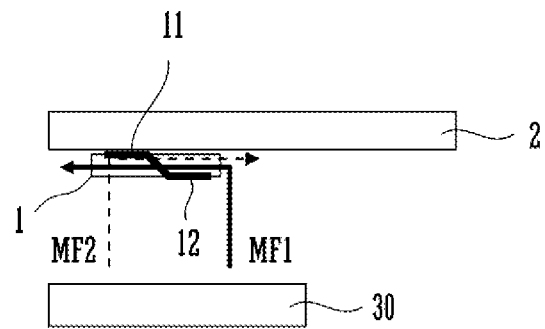
FIGS. 1A and 1B are drawings showing magnetic fluxes interlinked with the coil of an antenna device similar to the antenna device described in Patent Literature 1 when a change is made to the angle which the antenna device forms with the antenna device of a reader/writer.
Figure 1B:
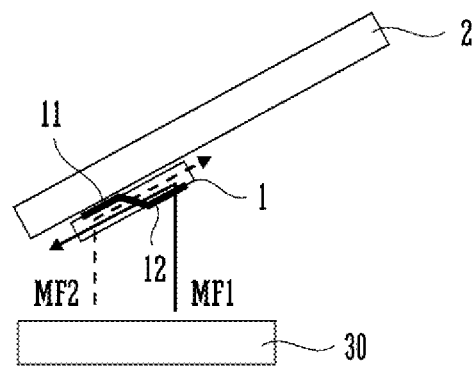

FIGS. 1A and 1B are drawings showing magnetic fluxes interlinked with the coil of an antenna device similar to the antenna device described in Patent Literature 1 when a change is made to the angle which the antenna device forms with the antenna device of a reader/writer. Solid-line arrows and broken-line arrows in FIGS. 1A and 1B schematically represent the magnetic fluxes.

A first main surface of a magnetic core 1 closely faces a flat conductor 2. A first conductor portion 11 of a coil conductor is adjacent to the first main surface of the magnetic core 1. A second conductor portion 12 thereof is adjacent to a second main surface of the magnetic core 1. An antenna coil composed of the magnetic core 1 and the coil conductor is disposed adjacent to an end portion of the flat conductor 2, forming an antenna device.

As shown in FIG. 1A, when the magnetic core 1 and the antenna device 30 of the reader/writer are in parallel with each other, that is, when the angle formed by both is 0°, a magnetic flux MF1 (solid line) coming into the right side of the magnetic core 1 is larger than a magnetic flux MF2 (broken line) coming into the left side thereof. Thus, electromotive force is generated in the coil.

However, as angles are made from that state, as shown in FIG. 1B, the magnetic flux MF1 coming into the side (right side) of the magnetic core 1 distant from the reader/writer is reduced and the magnetic flux MF2 coming into the side (left side) thereof adjacent to the reader/writer is increased. Thus, the right and left magnetic fluxes completely equal each other at a certain angle, generating a point where no electromotive force is generated. Communication is impossible in such a state.

FIGS. 2A and 2B are drawings showing the configuration of an antenna device according to a first exemplary embodiment. FIG. 2A is a plan view of an antenna device 101 including an antenna coil 21 and a rectangular plate-shaped circuit substrate 20 having the antenna coil 21 mounted thereon. FIG. 2B is a front view of the antenna device 101. FIG. 2C is a plan view of the antenna coil 21.

A magnetic core 1 can be a rectangular plate-shaped ferrite core. As shown in FIGS. 2A and 2B, a coil conductor CW is wound around the magnetic core 1. Specifically, the coil conductor CW having a shape of a rectangular spiral is formed on a flexible substrate 10, and a rectangular aperture is made in the central portion of the spiral. The magnetic core 1 is provided in the aperture.

The coil conductor CW includes a first conductor portion 11 adjacent to a first main surface MS1 of the magnetic core 1 and a second conductor portion 12 adjacent to a second main surface MS2 thereof. The magnetic core 1 and the coil conductor CW form the antenna coil 21.

The circuit substrate 20 includes a ground electrode formation area GA and a ground electrode non-formation area NGA. A ground electrode within the ground electrode formation area GA is a flat conductor according to the present disclosure.

The antenna coil 21 is mounted on the ground electrode non-formation area NGA of the circuit substrate 20 with the first main surface MS1 of the magnetic core 1 facing the circuit substrate 20. Accordingly, the first main surface MS1 of the magnetic core 1 faces a surface of the ground electrode non-formation area NGA (an extension of a surface of the ground electrode formation area GA). The antenna coil 21 is disposed outside an end portion of the ground electrode formation area GA in a plan view of the antenna coil 21 and the ground electrode formation area GA.

The first and second conductor portions 11 and 12 of the coil conductor are disposed so that the conductor portions do not overlap each other in a plan view of the magnetic core 1 (in a view from the direction of a normal to the first main surface MS1 or second main surface MS2 of the magnetic core 1).

In the state shown in FIG. 2B, the antenna device 101 is positioned (held over) in parallel with an antenna device 30 of a reader/writer. In this state, magnetic fluxes from the reader/writer are interlinked with the coil conductor CW of the antenna coil 21, causing magnetic coupling between both antenna devices.

Both end portions of the coil conductor CW of the antenna coil 21 are connected to predetermined terminal electrodes on the circuit substrate 20. The illustration of this connection structure is no shown.

FIG. 3 is a perspective view showing an angle θ, at which a mobile terminal 201 whose case contains the antenna device is held over the antenna device 30 of the reader/writer. The circuit substrate 20 shown in FIG. 2 is provided along the case of the mobile terminal. Thus, the disposition of the mobile terminal 201 in parallel with the antenna device 30 of the reader/writer results in the disposition of the antenna device 101 in parallel with the antenna device 30 of the reader/writer. The angle θ here is 0ca FIG. 4 includes drawings schematically showing the aspect of a magnetic flux passing through the antenna coil when the angle θ shown in FIG. 3 is changed.

When θ=0, the magnetic flux from the reader/writer passes through the central portion of the coil conductor CW formation area in a direction approximately perpendicular to the magnetic core 1.

When θ=45°, the magnetic flux from the reader/writer passes through the central portion of the coil conductor CW formation area in a direction of approximately 45° with respect to the magnetic core 1. Here, a magnetic flux passing through the coil conductor CW in an opposite direction as shown in FIG. 1B is extremely small.

When θ=90°, the magnetic flux from the reader/writer passes through the coil conductor CW formation area in the surface direction of the magnetic core 1. Here again, the direction of the magnetic flux passing through the coil conductor CW is the same.

Accordingly, the magnetic fluxes passing through the magnetic core in both directions do not cancel out each other, regardless of the value of the angle θ, at which the mobile terminal 201 is held over the antenna device 30 of the reader/writer.

Figure 5:
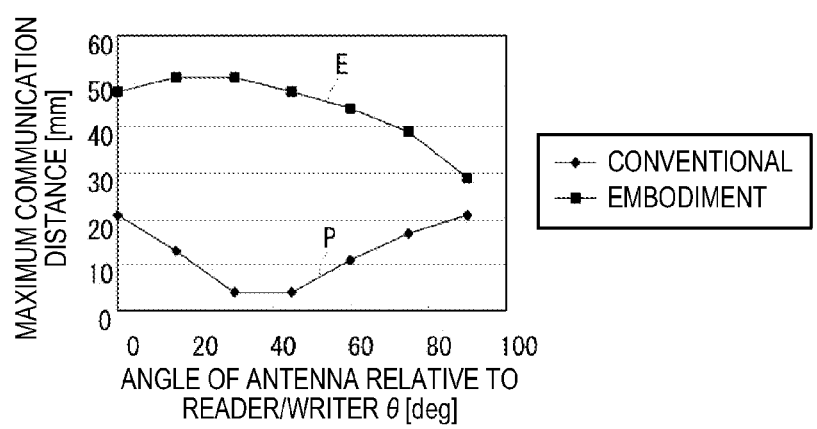
FIG. 5 is a graph showing the relationship between the angle θ, at which the mobile terminal is held over the reader/writer, and the maximum communication distance.

FIG. 5 is a graph showing the relationship between the angle θ, at which the mobile terminal is held over the reader/writer, and the maximum communication distance. In FIG. 5, a line E is a characteristic of the antenna device according to the first embodiment, and a line P is a characteristic of an antenna device having the conventional structure shown in FIG. 1. It is understood that, for the antenna device having the conventional structure, the maximum communication distance is extremely short in the range of 30° to about 45° of the angle θ; for the antenna device according to the present disclosure, the maximum communication distance can remain long over the full range of 0° to 90° (90° or more) of the angle θ.

FIG. 6A is a plan view of a magnetic core 1 included in an antenna coil according to a second exemplary embodiment, and FIG. 6B is a plan view of an antenna coil 22 according to the second exemplary embodiment.

The difference between the antenna coil 22 and the antenna coil 21 shown in FIG. 2C is that the magnetic core 1 is formed so that one end portion thereof is thicker than the other portions.

Use of the magnetic core 1 having such a shape can provide improvements in communication performance, such as strengthening of the magnetic flux passing through the magnetic core 1, strengthening of magnetic coupling with the antenna of a communication partner, and increasing of the maximum communication-capable distance. While, in FIG. 6B, the antenna coil 22 is formed so that the thicker portion of the magnetic core 1 is adjacent to the first conductor portion 11, the antenna coil may be formed so that the thicker portion of the magnetic core 1 is adjacent to the second conductor portion 12. The portion of the magnetic core 1 to be thickened (the portion to be widened) is not limited to the portion adjacent to the first conductor portion 11 or the portion adjacent to the second conductor portion 12. As seen, making one end portion of the magnetic core 1 thicker than the other portions increases the magnetism collection effect, further improving communication performance. Further, thickening the end portion of the magnetic core adjacent to the end portion of the ground conductor reduces magnetic resistance in the vicinity of the ground conductor, increasing the magnetism collection effect.

While, in the antenna coil 22 shown in FIG. 6, the magnetic core 1 is formed so that an entire one end portion thereof is wider (thicker), this portion may have a shape of a trapezoid which is widened outwardly. Alternatively, the magnetic core 1 may have a shape resembling a butterfly so that the width is increased from the center thereof toward both end portions thereof.

FIG. 7A is a plan view of a magnetic core 1 included in an antenna coil according to a third exemplary embodiment, and FIG. 7B is a plan view of an antenna coil 23 according to the third exemplary embodiment. The antenna coil 23 includes a flexible substrate 10 on which the rectangular plate-shaped magnetic core 1 and a coil conductor are formed. The difference between the antenna coil 23 and the antenna coil 22 shown in FIG. 6B is the structure of the magnetic core 1.

The magnetic core 1 shown in FIG. 7A is formed by forming a mixture of a magnetic powder, such as a ferrite powder, and a resin material into a sheet, forming the sheet into multiple small pieces, sintering the pieces to form sintered magnetic pieces, and laminating both surfaces of the pieces with films. Portions separated by broken lines in FIG. 7 represent the sintered magnetic pieces. Such a structure provides flexibility to the entire magnetic core 1.

While, in FIG. 7B, the antenna coil 23 is formed so that the thicker portion of the magnetic core 1 is adjacent to the first conductor portion 11, the portion to be thickened (the portion to be widened) of the magnetic core 1 is not limited to the portion adjacent to the first conductor portion 11 or the portion adjacent to the second conductor portion 12, as described in the second embodiment. As seen, making one end portion of the magnetic core 1 thicker than the other portions increases the magnetism collection effect in the position distant from the ground electrode formation area GA of the circuit substrate, further improving communication performance.

FIG. 8 is a drawing showing the state of the disposition of the antenna coil in a mobile terminal. In this example, the antenna coil 23 is attached to the inner surface of a case 200 of the mobile terminal. Due to its flexibility, the antenna coil 23 can be provided not only on the single plane within the case but also along the inner surface thereof. Thus, the antenna coil 23 can be easily built in cases of various shapes.

Figure 9:
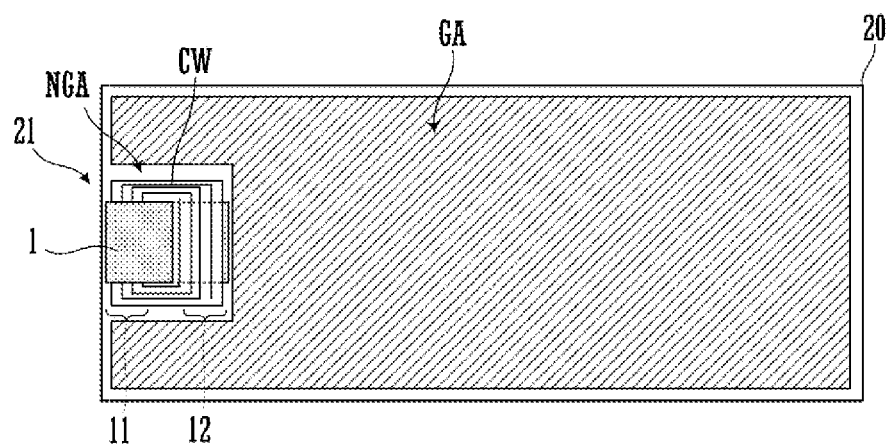
FIG. 9 is a drawing showing the configuration of an antenna device according to a fourth exemplary embodiment.

FIG. 9 is a plan view of an antenna device 104 according to a fourth exemplary embodiment. The antenna device 104 includes an antenna coil 21 and a rectangular plate-shaped circuit substrate 20 having the antenna coil 21 mounted thereon. Unlike the example shown in FIG. 2A, a ground electrode formation area GA extends to both side portions of the antenna coil 21. The other elements are the same as those shown in the first embodiment.

Figure 4:
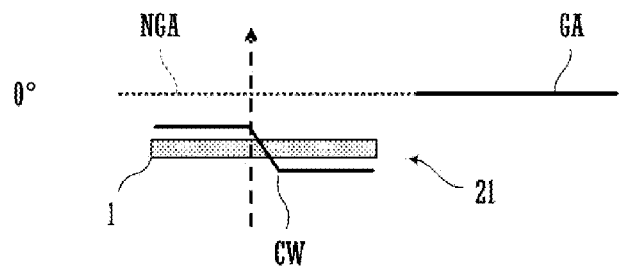
FIG. 4 includes drawings schematically showing the aspect of a magnetic flux passing through an antenna coil when the angle θ shown in FIG. 3 is changed.
Figure 4:
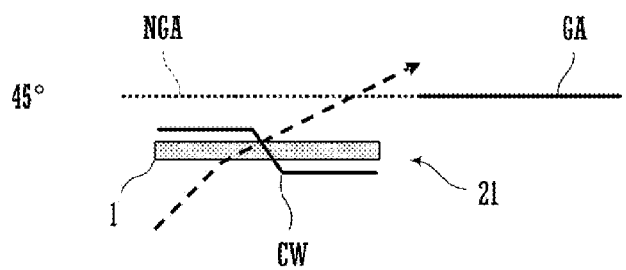
Figure 4:
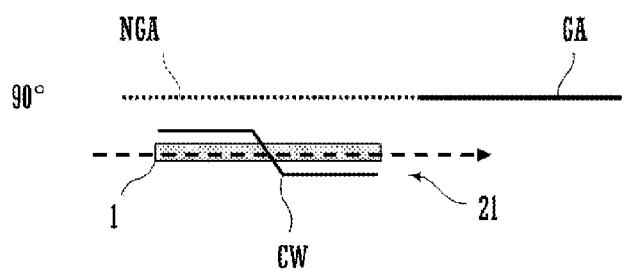

In such a configuration again, when the mobile terminal is held over the antenna device of the reader/writer as shown in FIG. 4, the magnetic fluxes passing through the magnetic core 1 in both directions do not easily cancel out each other.

While FIG. 9 shows the ground electrode formation area GA extending to both side portions of the antenna coil 21, the ground electrode formation area GA may extend to only one side portion of the antenna coil 21.

Figure 10:
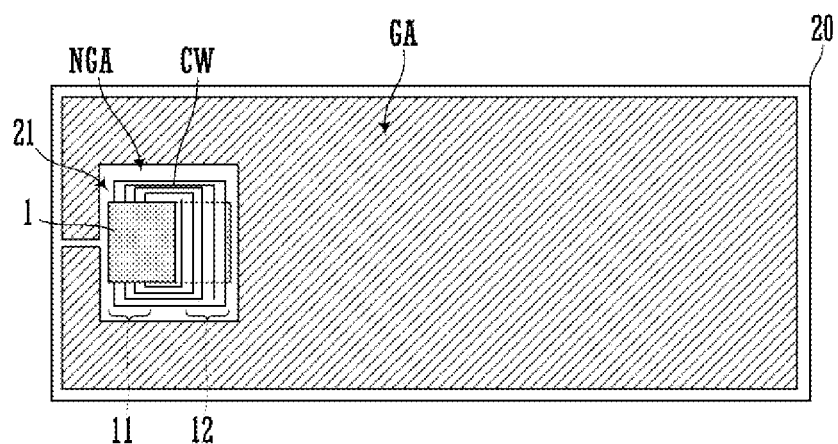
FIG. 10 is a drawing showing the configuration of an antenna device according to a fifth exemplary embodiment.

FIG. 10 is a plan view of an antenna device 105 according to a fifth exemplary embodiment.

The antenna device 105 includes an antenna coil 21 and a rectangular plate-shaped circuit substrate 20 having the antenna coil 21 mounted thereon. A ground electrode formation area GA is disposed so that it surrounds the antenna coil 21. The other elements are the same as those shown in the first exemplary embodiment.

In such a configuration again, when the mobile terminal is held over the antenna device of the reader/writer as shown in FIG. 4, the magnetic fluxes passing through the magnetic core 1 in both directions do not easily cancel out each other.

Figure 11A:
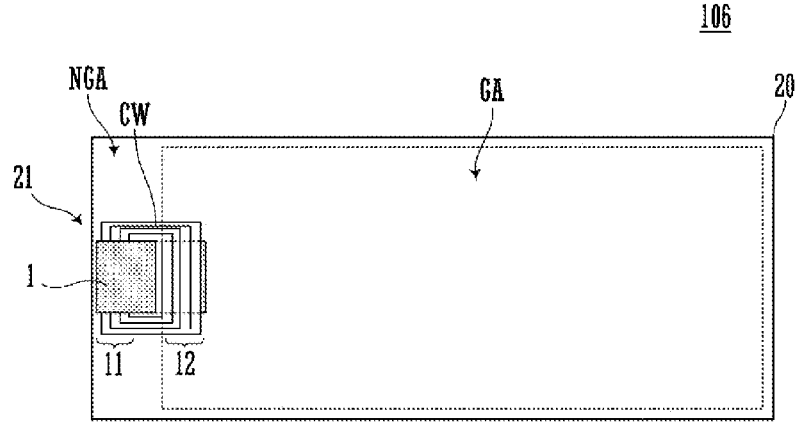
FIGS. 11A to 11C include drawings showing the configuration of an antenna device according to a sixth exemplary embodiment.
Figure 11B:
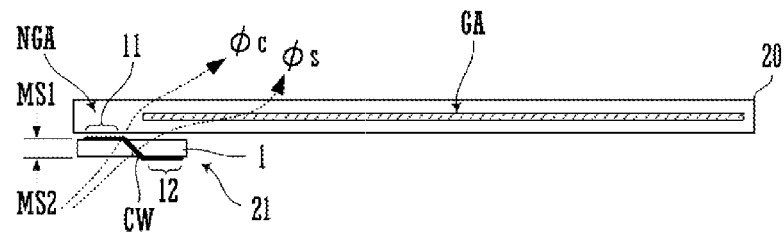
Figure 11C:
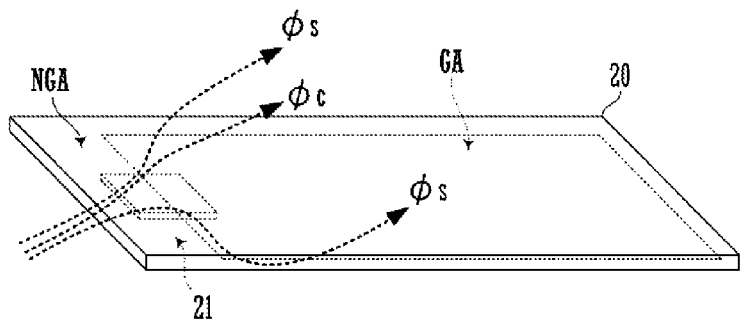

FIGS. 11A to 11C are drawings showing a configuration of an antenna device according to a sixth exemplary embodiment.

FIG. 11A is a plan view of an antenna device 106 including an antenna coil 21 and a rectangular plate-shaped circuit substrate 20 having the antenna coil 21 mounted thereon. FIG. 11B is a front view of the antenna device 106. FIG. 11C is a perspective view showing the aspects of magnetic fluxes passing through the antenna coil 21. FIG. 11C shows the antenna coil 21 in a simplified manner.

The circuit substrate 20 includes a ground electrode formation area GA and a ground electrode non-formation area NGA. In this example, a ground electrode is formed in an inner layer of the circuit substrate 20. The area where this ground electrode is formed is the ground electrode formation area GA. The antenna coil 21 is mounted in a position which overlaps both the ground electrode formation area GA and the ground electrode non-formation area NGA of the circuit substrate 20, with a first main surface MS1 of the magnetic core 1 facing the circuit substrate 20. The configuration of the antenna coil 21 is the same as that shown in the first embodiment.

When an angle θ, at which a mobile terminal whose case contains the antenna device 106 is held over an antenna device 30 of a reader/writer, is approximately 45°, a magnetic flux φs passes through the antenna device 106 as shown by broken-line arrows in FIGS. 11B and 11C. Specifically, the magnetic flux φs comes into the second main surface MS2 of the magnetic core 1 and passes through the magnetic core 1 toward sides of the ground electrode formation area GA. As seen, when θ=45°, the magnetic detection unit passes through the central winding portion of the coil conductor.

As shown in this example, the antenna coil may overlap the ground electrode formation area GA in a plan view. In such a configuration again, when the mobile terminal is held over the antenna device of the reader/writer, magnetic fluxes passing through the magnetic core 1 in both directions do not easily cancel out each other.

However, when the angle θ signal, at which the mobile terminal is held over the antenna device of the reader/writer, is 0°, the ground electrode formation area GA blocks the passage of the magnetic fluxes. For this reason, the communication distance is not increased so much. When the angle θ is 45°, the magnetic flux φc and φs pass through the ground electrode formation area GA. When the angle θ is 90°, the magnetic flux passes it through as shown in FIG. 4. As seen, even if the antenna coil overlaps the ground electrode formation area GA, in particular, even if the second conductor portion 12 of the coil conductor CW overlaps the ground electrode formation area GA, a sufficient communication distance can be secured when the angle θ formed by the antenna coil 21 and the antenna of the reader/writer is 45 to 90°.

While the ground electrode within the substrate has been shown as an example of the flat conductor in the above-mentioned embodiments, an antenna device can be formed using, for example, as the flat conductor, a shield plate disposed on the back of the liquid crystal panel, a conductive film or conductive foil formed on the inner surface of the case, or the battery pack. Further, the flat conductor is not limited to a rectangular conductor and can have various flat shapes. Further, the flat conductor can be composed of multiple layers rather than a single layer. Further, since the flat conductor is only required to be flat in its main portion, any other portion can include a bend.

In embodiments according to the present disclosure, when an angle the antenna device forms with the antenna of the reader/writer is in the range of 0° to 90°, the magnetic fluxes interlinked with the coil conductor in opposite directions do not equal each other. Thus, communications can be performed stably in the range of 0° to 90° or more or in a wider range.

Further, an antenna device can be easily formed by mounting the antenna coil on the ground electrode non-formation area of the circuit substrate.

Further, if the magnetic core is formed using sintered magnetic pieces, flexibility can be provided to the entire antenna coil. Thus, the magnetic core can be built in the case of a built-in destination electronic apparatus, such as a mobile terminal, with a high degree of freedom.

While exemplary embodiments have been described above, it is to be understood that variations and modifications will be apparent to those skilled in the art without departing from the scope and spirit of the disclosure.

That which is claimed is:

1. An antenna device comprising:
    an antenna coil, the antenna coil comprising:
        a plate-shaped magnetic core having first and second main surfaces, said first and second main surfaces of the magnetic core opposing one another; and
        a coil conductor wound around the magnetic core;
    a flat conductor adjacent to the antenna coil;
    first and second conductor portions, the first conductor portion including conductor segments positioned adjacent to one another and extending from a first end to a second end, respectively, of the first main surface of the magnetic core, the second conductor portion including conductor segments positioned adjacent to one another and extending from the first end to the second end, respectively, of the second main surface of the magnetic core, each of plural consecutive turns of the coil conductor including one segment of the first conductor portion and one segment of the second conductor portion, and an area of the first main surface covered by and between the adjacent conductor segments of the first conductor portion and an area of the second main surface covered by and between the adjacent conductor segments of the second conductor portion do not overlap at all in plan view of the magnetic core;
    the first main surface of the magnetic core faces a plane containing a surface of the flat conductor; and
    the antenna coil is provided in a position that does not overlap the flat conductor or in a position that overlaps the flat conductor only partly in a plan view of the flat conductor and the antenna coil.

2. The antenna device according to claim 1, wherein
    the flat conductor is a ground electrode formed within a circuit substrate, and
    the antenna coil is disposed on a ground electrode non-formation area of the circuit substrate, the ground electrode non-formation area being an area where the ground electrode is not formed.

3. The antenna device according to claim 1, wherein
    the magnetic core is a sheet-shaped mixture of a magnetic powder and a resin material or a plurality of sintered magnetic pieces.

4. The antenna device according to claim 2, wherein
    the magnetic core is a sheet-shaped mixture of a magnetic powder and a resin material or a plurality of sintered magnetic pieces.

5. The antenna device according to claim 1, wherein
    the magnetic core is formed so that one end portion thereof is thicker than the other portions thereof.

6. The antenna device according to claim 2, wherein
    the magnetic core is formed so that one end portion thereof is thicker than the other portions thereof.

7. The antenna device according to claim 3, wherein
    the magnetic core is formed so that one end portion thereof is thicker than the other portions thereof.

8. The antenna device according to claim 4, wherein
    the magnetic core is formed so that one end portion thereof is thicker than the other portions thereof.

9. A mobile terminal comprising:
    a case; and
    the antenna device according to claim 1 contained in the case.

10. A mobile terminal comprising:
    a case; and
    the antenna device according to claim 2 contained in the case.

11. A mobile terminal comprising:
    a case; and
    the antenna device according to claim 3 contained in the case.

12. A mobile terminal comprising:
    a case; and
    the antenna device according to claim 4 contained in the case.

13. A mobile terminal comprising:
    a case; and
    the antenna device according to claim 5 contained in the case.

14. A mobile terminal comprising:
    a case; and
    the antenna device according to claim 6 contained in the case.

15. A mobile terminal comprising:
    a case; and
    the antenna device according to claim 7 contained in the case.

16. A mobile terminal comprising:
    a case; and
    the antenna device according to claim 8 contained in the case.

* * * * *